United States Patent [19]

Kawagishi et al.

[11] Patent Number: 5,035,491

[45] Date of Patent: Jul. 30, 1991

[54] LIQUID CRYSTAL APPARATUS

[75] Inventors: Hideyuki Kawagishi, Fujisawa; Hirofumi Iwamoto, Hiratsuka; Akira Tsuboyama, Sagamihara; Tadashi Mihara, Kawasaki, all of Japan

[73] Assignee: Canon Kabushiki Kaisha, Tokyo, Japan

[21] Appl. No.: 503,678

[22] Filed: Apr. 3, 1990

[30] Foreign Application Priority Data

| Apr. 3, 1989 | [JP] | Japan | 1-81547 |
| Apr. 3, 1989 | [JP] | Japan | 1-81548 |
| Apr. 3, 1989 | [JP] | Japan | 1-81549 |
| Apr. 3, 1989 | [JP] | Japan | 1-81550 |

[51] Int. Cl.$^5$ .............................. G02F 1/13
[52] U.S. Cl. ........................ 350/350 S; 350/337
[58] Field of Search ................. 350/350 S, 340, 341, 350/334, 337

[56] References Cited

U.S. PATENT DOCUMENTS 4,902,107  2/1990  Tsuboyama et al.
4,932,758  6/1990  Hanyu et al. ............. 350/350 S

FOREIGN PATENT DOCUMENTS 0061234  3/1988  Japan ............. 350/350 S
0124030  5/1988  Japan ............. 350/350 S Primary Examiner—Stanley D. Miller
Assistant Examiner—Huy K. Mai
Attorney, Agent, or Firm—Fitzpatrick, Cella, Harper & Scinto

[57] ABSTRACT

A liquid crystal apparatus, comprising: a liquid crystal cell comprising a pair of substrates, and a chiral smectic liquid crystal showing at least two different optically stable states formed by cooling from a uniaxial alignment phase and disposed between the substrates; and a polarizer and an analyzer disposed to sandwiched the liquid crystal cell; wherein the chiral smectic liquid crystal, polarizer and analyzer are disposed to satisfy any one of the following sets of conditions I-IV characterized by combination of X, Y and Z directions shown below:

| X | Y | Z |
|---|---|---|
| I clockwise | counterclockwise | perpendicular |
| II clockwise | clockwise | parallel |
| III counterclockwise | counterclockwise | parallel |
| IV counterclockwise | clockwise | perpendicular | with proviso that the chiral smectic liquid crystal is disposed so that the long axes of the chiral smectic liquid crystal molecules are aligned with a twist in the X direction along the direction from the polarizer toward the analyzer to form an average molecular long axis proving one optically stable state, and when the average molecular long axis is switched to provide another optically stable state latched in the Y direction with respect to the direction from the analyzer toward the polarizer, the polarizer is disposed to have an electric vector transmission axis which is substantially in the Z direction with respect to the average molecular long axis.

32 Claims, 16 Drawing Sheets

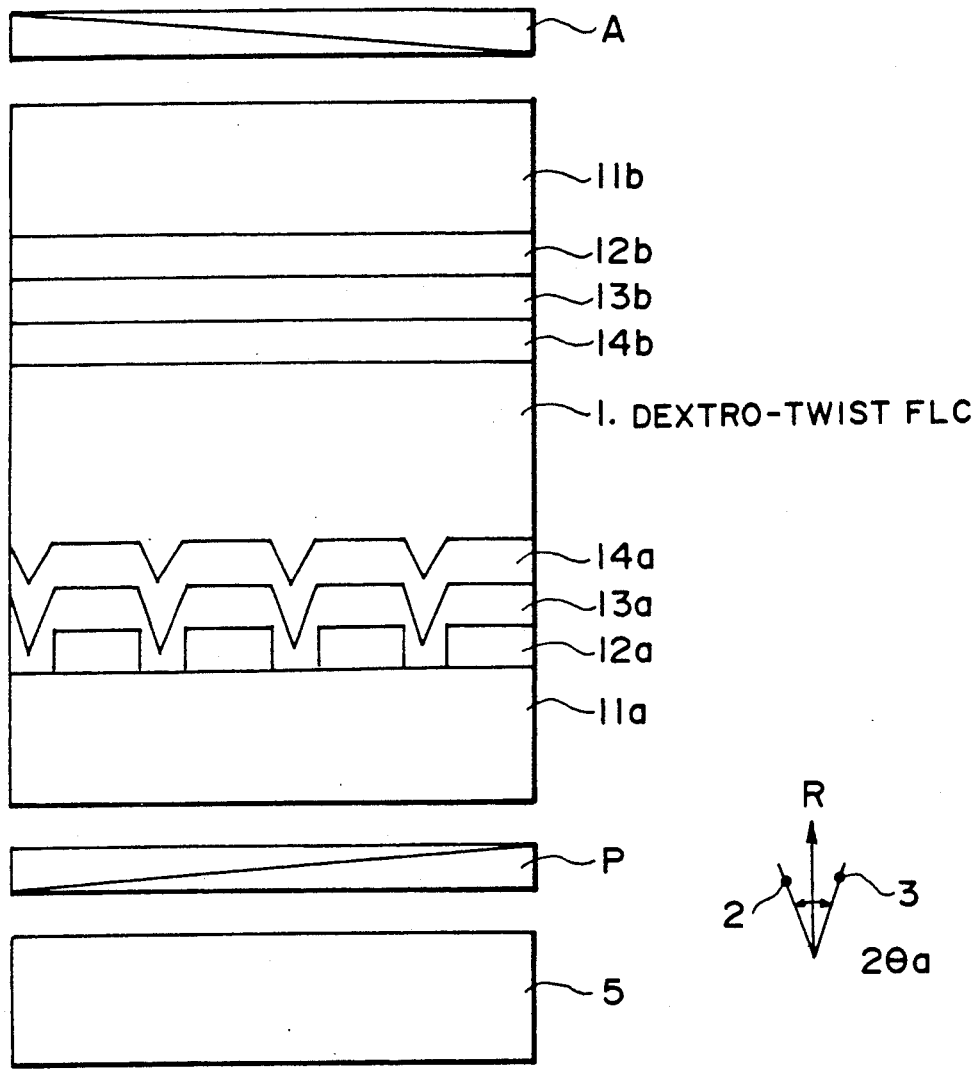
FIG. 1A
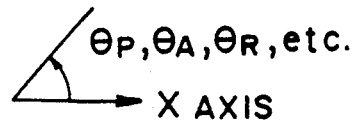
FIG. 1D
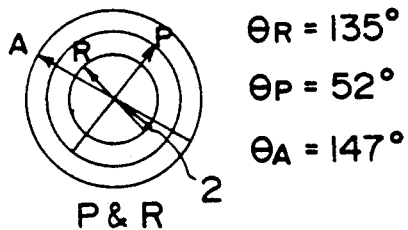
$\theta_R = 135°$
$\theta_P = 52°$
$\theta_A = 147°$
FIG. 1B
$\theta_P, \theta_A, \theta_R,$ etc.
→ X AXIS
FIG. 1C

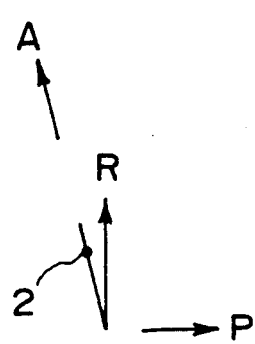 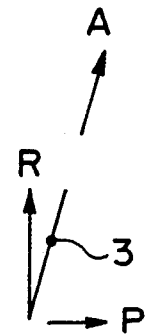
(PALE BROWN ~ PALE YELLOW)     (PURPLE ~ BLUE PURPLE ~ BLUE ~ PALE BLUE)
F I G. 3A
COLOR OF FLC IN LEVO TWIST
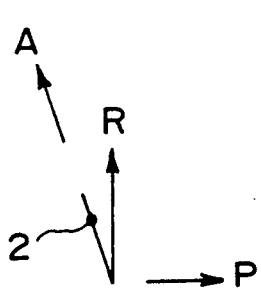 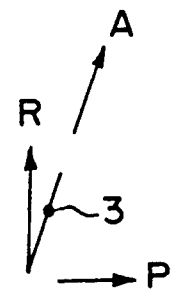
(PURPLE ~ BLUE PURPLE ~ BLUE ~ PALE BLUE)     (PALE BROWN ~ PALE YELLOW)
F I G. 3B
COLOR OF FLC IN DEXTRO TWIST

VIEW ANGLE-DEPENDENCE
OF COLOR INTENSITY (EXAMPLE 1)

(COMP. EX. 1)

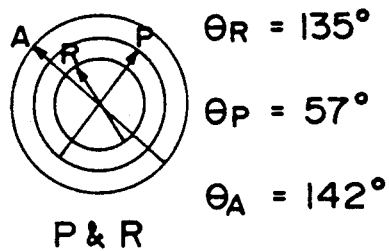 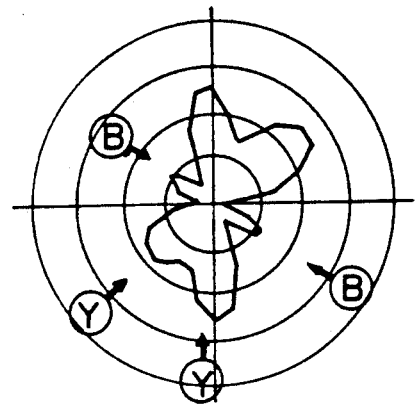
F I G. 6A
(EX. 2)
F I G. 6B
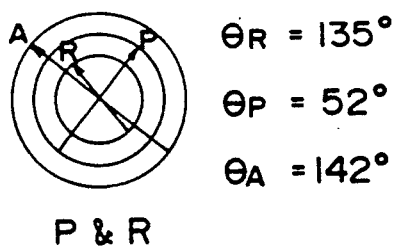 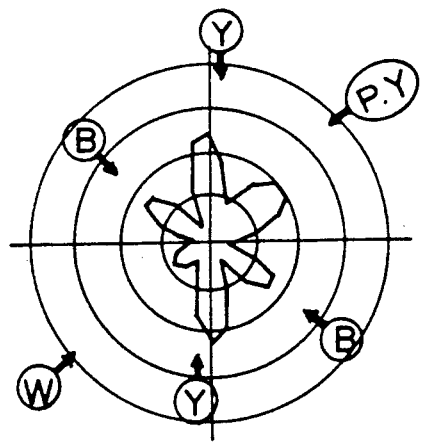
F I G. 7A
(EX. 3)
F I G. 7B

$\Theta_R = 135°$
$\Theta_P = 147°$
$\Theta_A = 52°$ (COMP. EX. 2)

$\Theta_R = 135°$
$\Theta_P = 142°$
$\Theta_A = 52°$ (COMP. EX. 3)

(EX. 4)

(COMP. EX. 4)

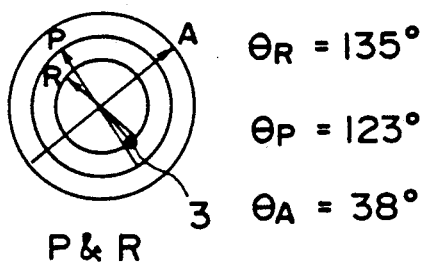 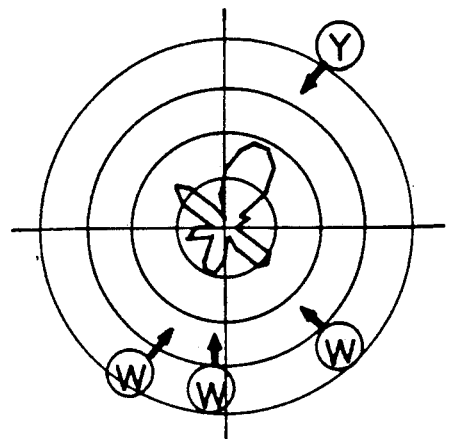
FIG. 13A
(EX. 5)
FIG. 13B
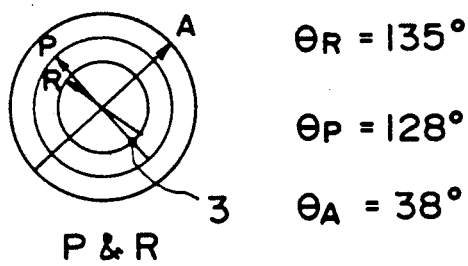 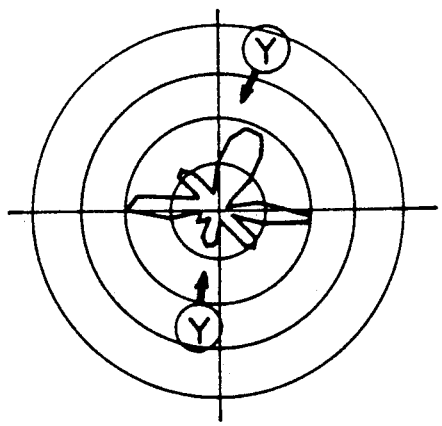
FIG. 14A
(EX. 6)
FIG. 14B $\theta_R = 135°$
$\theta_P = 33°$
$\theta_A = 128°$ (COMP. EX. 5)

$\theta_R = 135°$
$\theta_P = 38°$
$\theta_A = 128°$ (COMP. EX. 6)

$\theta_R = 135°$
$\theta_P = 42°$
$\theta_A = 57°$

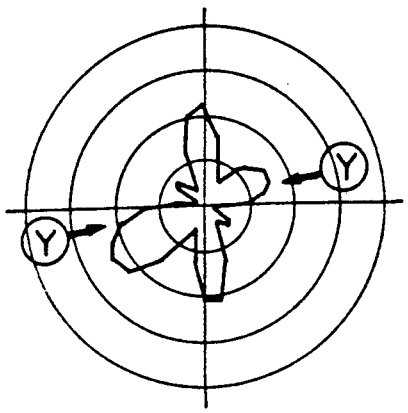
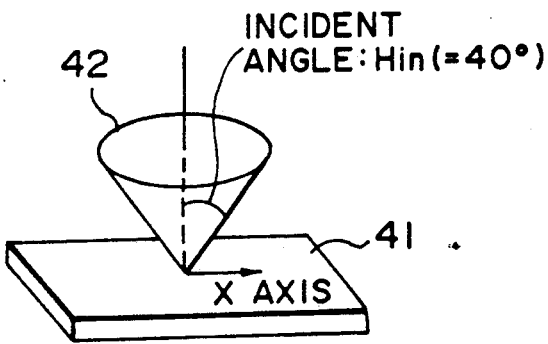
FIG. 19A
(EX. 7)
FIG. 19B
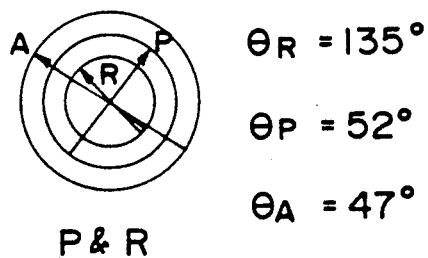
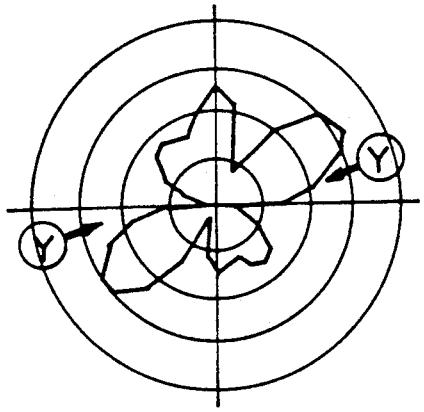
$\theta_R = 135°$
$\theta_P = 52°$
$\theta_A = 47°$
FIG. 20A
(COMP. EX. 7)
FIG. 20B

$\theta_R = 135°$
$\theta_P = 147°$
$\theta_A = 123°$ (EX. 8)

$\theta_R = 135°$
$\theta_P = 142°$
$\theta_A = 52°$ (EX. 9)

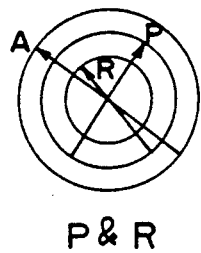
$\theta_R = 135°$
$\theta_P = 57°$
$\theta_A = 142°$
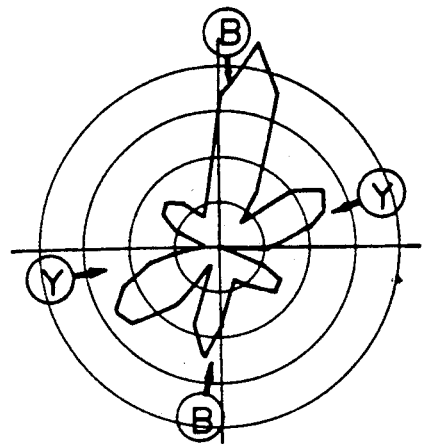
FIG. 23A
(COMP. EX. 8)
FIG. 23B
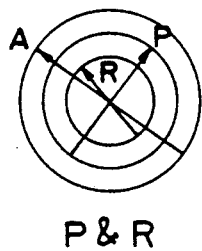
$\theta_R = 135°$
$\theta_P = 52°$
$\theta_A = 142°$
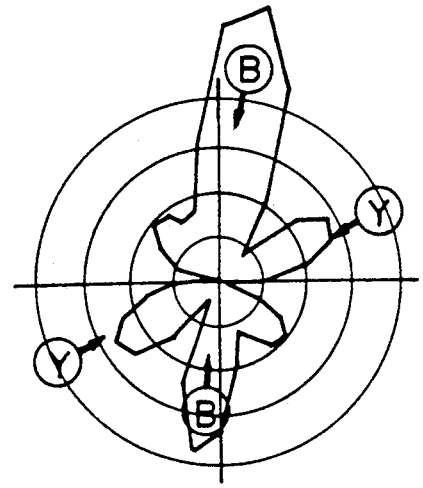
FIG. 24A
(COMP. EX. 9)
FIG. 24B

(EX. 10)

(COMP. EX. 10)

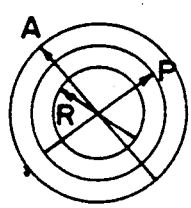 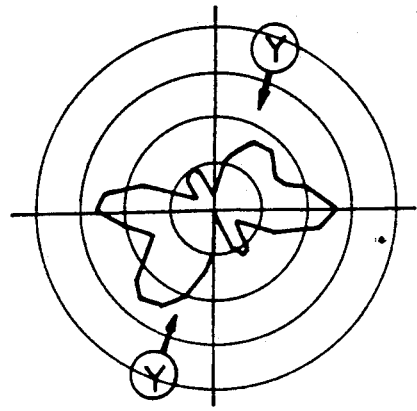
FIG. 28A
(COMP. EX. 11)
FIG. 28B
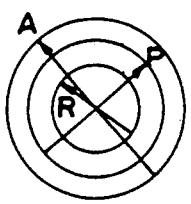 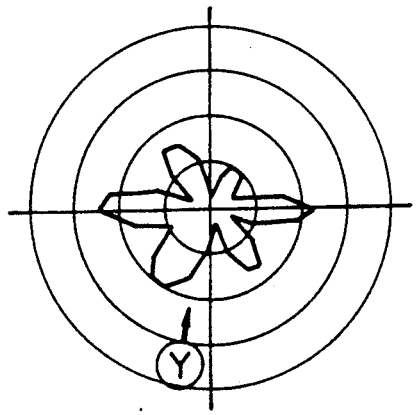
FIG. 29A
(EX. 12)
FIG. 29B

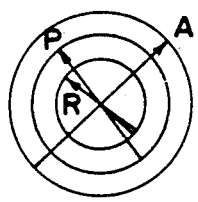 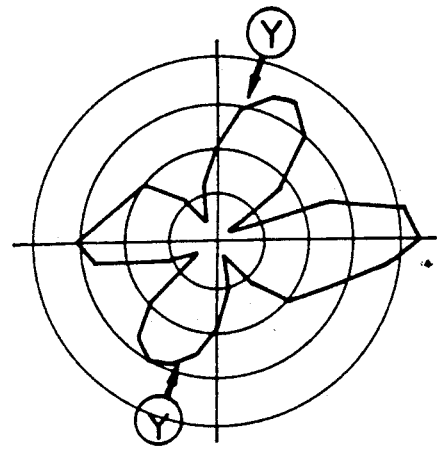
FIG. 30A
(COMP. EX. 11)
FIG. 30B
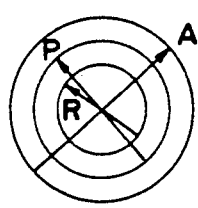 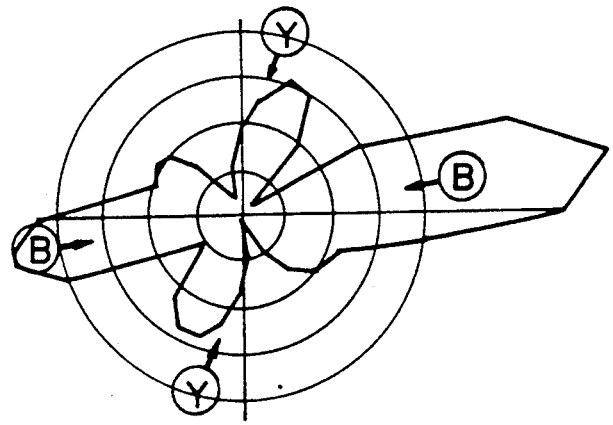
FIG. 31A
(COMP. EX. 12)
FIG. 31B

LIQUID CRYSTAL APPARATUS

FIELD OF THE INVENTION AND RELATED ART

The present invention relates to a display apparatus using a chiral smectic (SmC*) liquid crystal showing ferroelectricity, particularly a ferroelectric liquid crystal display apparatus with a suppressed coloring or tinging.

In recent years, ferroelectric liquid crystal cells have been extensively developed in place of conventional nematic liquid crystal cells. A ferroelectric liquid crystal cell comprises a pair of substrates and a ferroelectric liquid crystal (FLC) disposed between the substrates disposed with a gap sufficiently small to suppress the formation of helical alignment structure of liquid crystal molecules in the chiral smectic phase in the bulk state, so that perpendicular molecular layers each composed of a plurality of liquid crystal molecules are aligned in one direction. Such a ferroelectric liquid crystal cell is characterized by a memory characteristic and high speed responsiveness attributable to a spontaneous polarization. An FLC display having a cell gap on the order of 1.0-2.0 microns and utilizing a so-called splay alignment state wherein molecules are aligned while being twisted, is approaching a level of practical utility.

Such an FLC display developed heretofore is accompanied with a difficulty that its bright state is tinged with pale yellow or pale blue depending on the viewing angle or direction and thus has left a problem in respect of display quality.

SUMMARY OF THE INVENTION

In view of the above-mentioned problem of a known FLC display, an object of the present invention is to provide a ferroelectric liquid crystal apparatus, particularly a display apparatus, with a high display quality by suppressing coloring or tinging in the bright state.

According to the present invention, there is provided a liquid crystal apparatus, comprising: a liquid crystal cell comprising a pair of substrates, and a chiral smectic liquid crystal showing at least two different optically stable states formed by cooling from a uniaxial alignment phase and disposed between the substrates; and a polarizer and an analyzer disposed to sandwich the liquid crystal cell; wherein the chiral smectic liquid crystal, polarizer and analyzer are disposed to satisfy any one of the following sets of conditions I-IV characterized by combination of X, Y and Z directions shown below:

| X | Y | Z |
|---|---|---|
| I clockwise | counterclockwise | perpendicular |
| II clockwise | clockwise | parallel |
| III counterclockwise | counterclockwise | parallel |
| IV counterclockwise | clockwise | perpendicular | with proviso that the chiral smectic liquid crystal is disposed so that the long axes of the chiral smectic liquid crystal molecules are aligned with a twist in the X direction along the direction from the polarizer toward the analyzer to form an average molecular long axis proving one optically stable state, and when the average molecular long axis is switched to provide another optically stable state latched in the Y direction with respect to the direction from the analyzer toward the polarizer, the polarizer is disposed to have an electric vector transmission axis which is substantially in the Z direction with respect to the average molecular long axis.

According to the above arrangement, the coloring of the whole panel is suppressed.

Further, it is preferred to shift the electric vector transmission axis of the analyzer by an angle in the range of 0-20 degrees, preferably 1-10 degrees, in the direction of brightening the bright state from the position of the right angle cross nicols.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A-1D are a sectional view and schematic views for illustrating an ferroelectric display apparatus according to an embodiment (Example 1) of the present invention.

FIGS. 3A and 3B are schematic views for illustrating a method of examining the dextro-twist alignment structure.

FIGS. 6A and 6B are graphs showing polarizing plates directions and the panel color intensity according to Example 2.

FIGS. 7A and 7B are graphs showing polarizing plates directions and the panel color intensity according to Example 3.

FIGS. 13A and 13B are graphs showing polarizing plates directions and the panel color intensity according to Example 5.

FIGS. 14A and 14B are graphs showing polarizing plates directions and the panel color intensity according to Example 6.

FIGS. 19A and 19B are a graph showing the panel color intensity of the display apparatus of Example 7 and a schematic view illustrating a viewing angle.

FIGS. 20A and 20B are graphs showing polarizing plates directions and the panel color intensity according to Comparative Example 7.

FIGS. 23A and 23B are graphs showing polarizing plates directions and the panel color intensity according to Comparative Example 8.

FIGS. 24A and 24B are graphs showing polarizing plates directions and the panel color intensity according to Comparative Example 9.

FIGS. 28A and 28B are graphs showing polarizing plates directions and the panel color intensity according to Example 11.

FIGS. 29A and 29B are graphs showing polarizing plates directions and the panel color intensity according to Example 12.

FIGS. 30A and 30B are graphs showing polarizing plates directions and the panel color intensity according to Comparative Example 11.

FIGS. 31A and 31B are graphs showing polarizing plates directions and the panel color intensity according to Comparative Example 12.

DESCRIPTION OF THE PREFERRED EMBODIMENTS

Figures 2A, 2B, 2C:
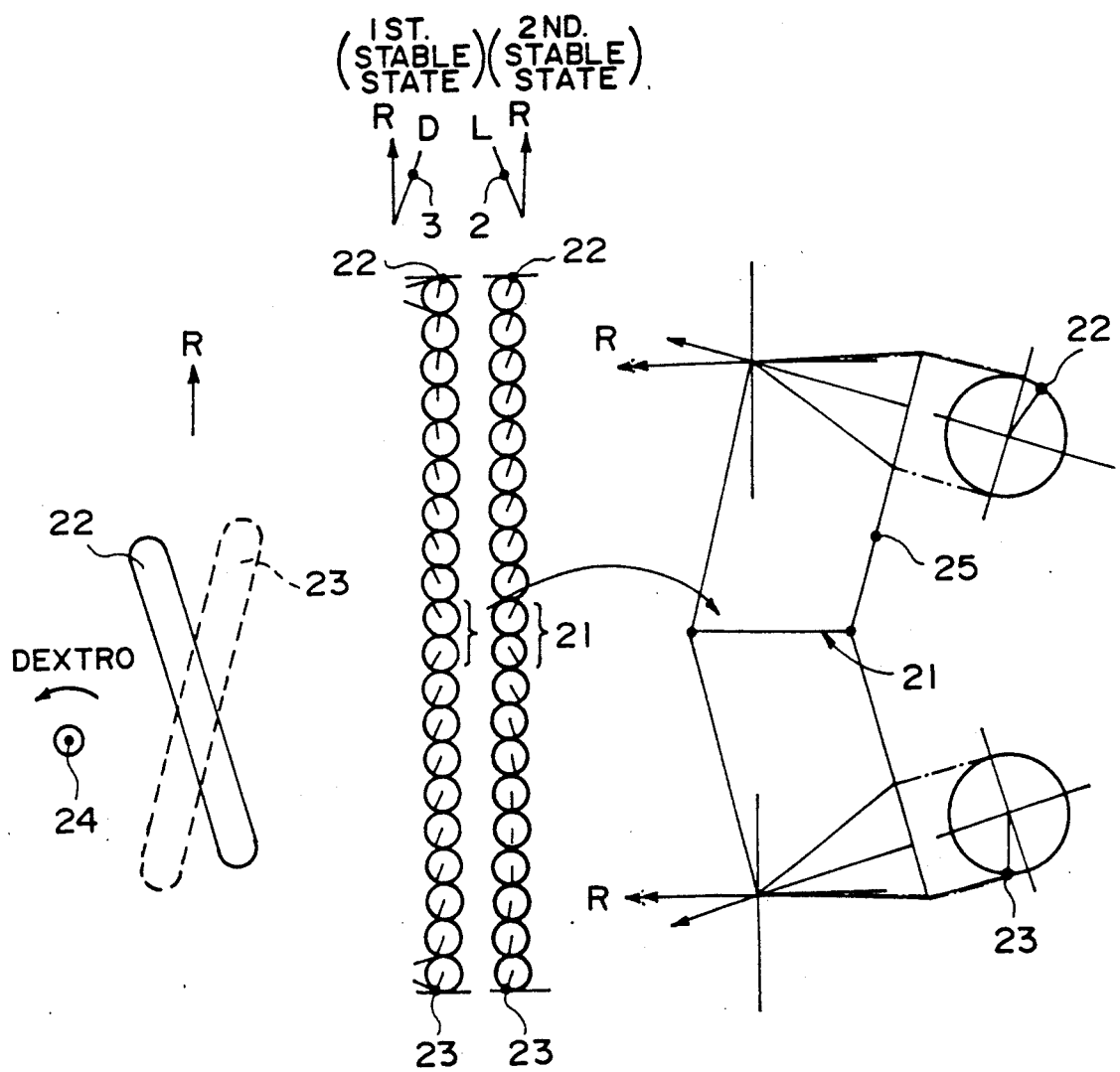
FIGS. 2A-2C are schematic views for illustrating a dextro-twist alignment structure.

Preferred embodiments of the present invention will now be described with reference to drawings.

EXAMPLE 1

FIG. 1A is a sectional view of a ferroelectric chiral smectic liquid crystal display apparatus according to an embodiment of the present invention. Referring to FIG. 1A, an analyzer A is disposed as a polarizing plate closer to an observer's eye 4 and remoter from a light source 5, and a polarizer P is disposed as a polarizing plate closer to the light source 5 and remoter from the observer's eye 4. An ferroelectric liquid crystal 1 is disposed in a dextro-twisted (clockwise rotatory) alignment structure along the direction from the polarizer P toward the analyzer A and sandwiched between a pair of transparent substrates 11a and 11b respectively having thereon electrodes 12a, 12b, transparent insulating films 13a, 13b of, e.g., $SiO_2$, and alignment films 14a, 14b. In a particular embodiment, the light source 5 was a three-wavelength type light source (trade name "Mellowlook Akari-chan", available from Thoshiba K.K.) which was known as a bright backlight source.

FIG. 1B is a schematic view for illustrating a relationship of the positions of the analyzer A and polarizer P and a rubbing axis (which is substantially identical to the extension of the liquid crystal molecular long axis in a uniaxial anisotropic (or alignment) phase, such as nematic phase or smectic A phase). FIG. 1B shows characteristics of this embodiment that the electric vector transmission axis P of the polarizer is set to a direction perpendicular to the average molecular long axis when it is latched in the counter-clockwise direction with respect to the direction from the analyzer A to the polarizer P (i.e., the left average molecular long axis 2), and the electric vector transmission axis A of the analyzer is shifted from the position of the right angle cross nicols by an angle in the range of 0–20 degrees in the direction of providing a brighter bright state. In this particular example, the analyzer axis A is shifted by 5 degrees in the direction of brightening the bright state given by right-angle cross nicols.

FIG. 1C is a view for illustrating the definitions of angles $\theta_P$, $\theta_A$ and $\theta_R$ from a reference axis (arbitrary X-axis) of the electric vector transmission axis P of a polarizer, the electric vector transmission axis A of an analyzer, and rubbing axis R, respectively. In this embodiment, various angles are defined as angles from the X-axis as shown in FIG. 1C. In terms of angles from the X-axis, the relative positions among the electric vector transmission axis $P_0$ of the polarizer, the electric vector transmission axis A of the analyzer and the rubbing axis R are explained by: $\theta_R = 135$ degrees, $\theta_P = 52$ degrees and $\theta_A = 147$ degrees.

FIG. 1D further shows a right average molecular axis 3 which is the average molecular axis when it is latched in the clockwise direction with respect to the direction from the analyzer A to the polarizer P. As a result, an angle $2\theta a$ shown in FIG. 1D represents an angle between the left average molecular axis 2 and the right average molecular axis 3, and $\theta a$ represents a tilt angle.

FIGS. 2A–2C are schematic views for illustrating a dextro-twist alignment structure of a ferroelectric chiral smectic liquid crystal used in this embodiment. More specifically, FIG. 2A is a schematic view showing that the relationship between the liquid crystal molecular long axis 23 at the lower boundary (with the lower substrate) and the liquid crystal molecular long axis 22 at the upper boundary (with the upper substrate) is such that the molecular axes are twisted in the dextro-rotatory direction with respect to the direction 24 from the lower substrate 11a toward the upper substrate 11b. FIG. 2B is a schematic view showing states of change of C-directors of liquid crystal as viewed from bottoms of cones of chiral smectic liquid crystal ranging from the lower substrate 11a to the upper substrate 11b with respect to a first stable state providing the right (D) average molecular axis 3 and a second stable state providing the left (L) average molecular axis 2. It is also shown that a dextro-twist occurs from the molecules 23 at the lower boundary to the molecules 22 at the upper boundary. Further, FIG. 1C is a schematic view showing a chevron-type layer structure of a chiral smectic liquid crystal including Sm*C layers 25, molecules 21 in a central part which are aligned parallel to substrate boundaries, and rubbing directions R.

In order to obtain the above-mentioned dextro-twist alignment structure, it is effective to use a ferroelectric liquid crystal having a negative Ps (spontaneous polarization) and a polar alignment film having a dipole moment directed generally inward of the cell, or to use a ferroelectric liquid crystal having a positive Ps and a polar alignment film having a dipole moment directed generally outward of the cell.

In a particular example of the above embodiment, a dextro-twist alignment state was attained by injecting a ferroelectric liquid crystal "CS 1011" (trade name, available from Chisso K.K.) characterized by a negative Ps into a 1.5 microns-thick FLC cell having polyimide alignment films.

In addition, it was confirmed that such a dextro-twist alignment state could also be formed by ferroelectric liquid crystal's "CS 1013" (trade name), "CS 1014" (trade name) (available from Chisso K.K.), etc., having a negative Ps in FLC cells with thicknesses of 1.0–2.5 microns having organic alignment films, such as films of polyimide and polyethylene oxide.

FIGS. 3A and 3B are views for illustrating a method of examining such a dextro-twist state. These figures show color differences accompanying dextro-twist alignment and levo-twist alignment in chiral smectic liquid crystal cells with a thickness of about 1.0–2.5 microns. More specifically, as shown in FIG. 3B, a chiral smectic liquid crystal cell in a dextro-twist alignment provides, (1) colors of purple—blue purple—pale blue in the second stable state having the left average molecular axis 2, e.g., at $\theta_A = 105$ degrees, $\theta_P = 0$ degree and $\theta_R = 90$ degrees, and (2) colors of pale brown—pale yellow in the first stable state having the right average molecular axis 3, e.g., at $\theta_A = 75$ degrees, $\theta_P = 0$ degree and $\theta_R$ 90 degrees.

From the above, a dextro-twist alignment can be identified.

On the other hand, a chiral smectic liquid crystal cell in a levo-twist alignment, as shown in FIG. 3A, provides, (1) colors of pale brown—pale yellow in the second stable state having the left average molecular axis 2, e.g., at $\theta A = 105$ degrees, $\theta_P = 0$ degree and $\theta_R$ 90 degrees, and (2) colors of purple—blue purple—pale blue in the first stable state having the right average molecular axis 3, e.g., at $\theta_A = 75$ degrees, $\theta_P = 0$ degree and $\theta_R$ 90 degrees.

Thus, a levo-twist alignment can be identified.

Figure 4A:
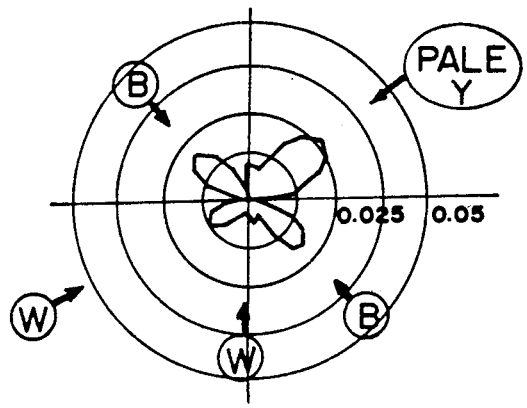
FIGS. 4A and 4B are a graph showing the panel color intensity of the display apparatus of Example 1 and a schematic view illustrating a viewing angle.
Figure 4B:
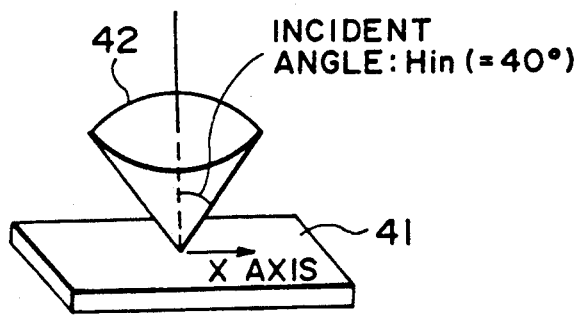

FIG. 4A is a view showing a viewing angle-dependence of the color intensity in the bright state of the above embodiment. Herein, as shown in FIG. 4B, the viewing angle is defined as an angle from a reference axis (an arbitrary selected X-axis) when a point of viewing a chiral smectic liquid crystal panel 41 is changed along an orbit 42 like a conical rim with a fixed incident angle $H_{in}$ ($H_{in}$ is fixed at 40 degrees). In FIG. 4A, the viewing angle corresponds to an angle of rotation along four concentric circles.

Further, in FIG. 4A, a distance from the Center of the concentric circles represents a color intensity in terms of a distance between the chromaticity coordinates of the observed panel and the chromaticity coordinates of the standard light C on the color coordinate system (x, y) according to JIS Z8701. Further, some representative hues depending on observation directions are also shown together with arrows indicating the observation directions.

COMPARATIVE EXAMPLE 1

Figure 5A:
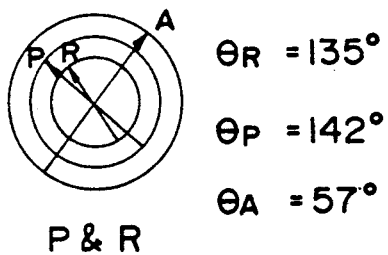
FIGS. 5A and 5B are graphs showing polarizing plates directions and the panel color intensity according to Comparative Example 1.

A display apparatus of Comparative Example 1 was prepared in the same manner as in the above Example 1 except that the positions of the analyzer axis A, the polarizer axis P and the rubbing axis R were changed to provide $\theta R = 135$ degrees, $\theta_P = 142$ degrees and $\theta_A = 57$ degrees as shown in FIG. 5A.

Figure 5B:
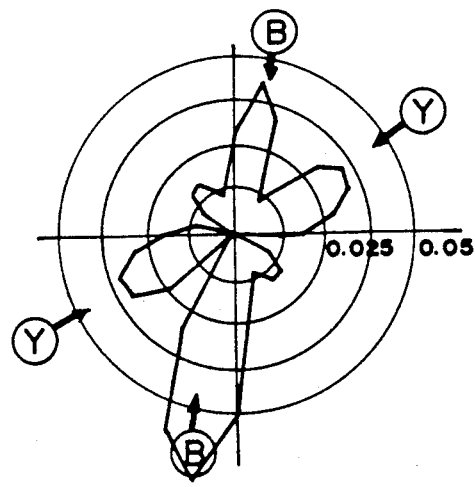

FIG. 5B shows a viewing angle-dependence of color intensity according to Comparative Example 1. In view of FIG. 5B and FIG. 4A in comparison, it is understood that the coloring of the liquid crystal display apparatus of Example 1 was remarkably improved compared with that of Comparative Example 1.

EXAMPLE 2

A display apparatus of Example 2 was prepared in the same manner as in Example 1 except that the positions of the analyzer axis A, the polarizer axis P and the rubbing axis R were changed to provide $\theta_R = 135$ degrees, $\theta_P = 57$ degrees and $\theta_A = 142$ degrees as shown in FIG. 6A.

At this time, the viewing angle-dependence of color intensity as shown in FIG. 6B was attained.

EXAMPLE 3

A display apparatus of Example 3 was prepared in the same manner as in Example 1 except that the positions of the analyzer axis A, the polarizer axis P and the rubbing axis R were changed to provide $\theta_R = 135$ degrees, $\theta_P = 52$ degrees and $\theta_A = 142$ degrees as shown in FIG. 7A.

At this time, the viewing angle-dependence of color intensity as shown in FIG. 7B was attained.

COMPARATIVE EXAMPLE 2

Figure 8A:
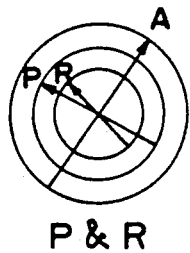
FIGS. 8A and 8B are graphs showing polarizing plates directions and the panel color intensity according to Comparative Example 2.

A display apparatus of Comparative Example 2 was prepared in the same manner as in Example 1 except that the positions of the analyzer axis A, the polarizer axis P and the rubbing axis R were changed to provide $\theta_R = 135$ degrees, $\theta_P = 147$ degrees and $\theta_A = 52$ degrees as shown in FIG. 8A.

Figure 8B:
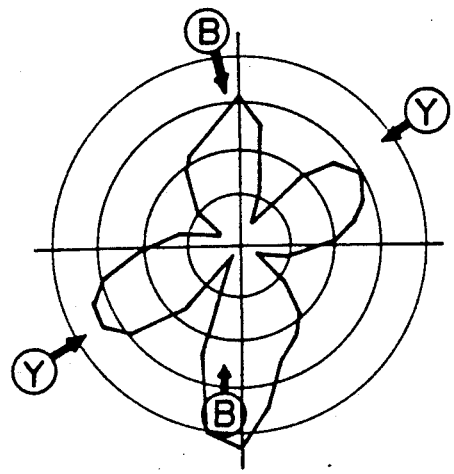

At this time, the viewing angle-dependence of color intensity as shown in FIG. 8B was attained.

COMPARATIVE EXAMPLE 3

Figure 9A:
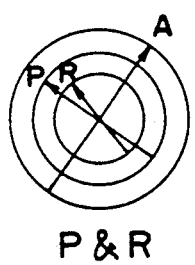
FIGS. 9A and 9B are graphs showing polarizing plates directions and the panel color intensity according to Comparative Example 3.

A display apparatus of Comparative Example 3 was prepared in the same manner as in Example 1 except that the positions of the analyzer axis A, the polarizer axis P and the rubbing axis R were changed to provide $\theta_R = 135$ degrees, $\theta_P = 142$ degrees and $\theta_A = 52$ degrees as shown in FIG. 9A.

Figure 9B:
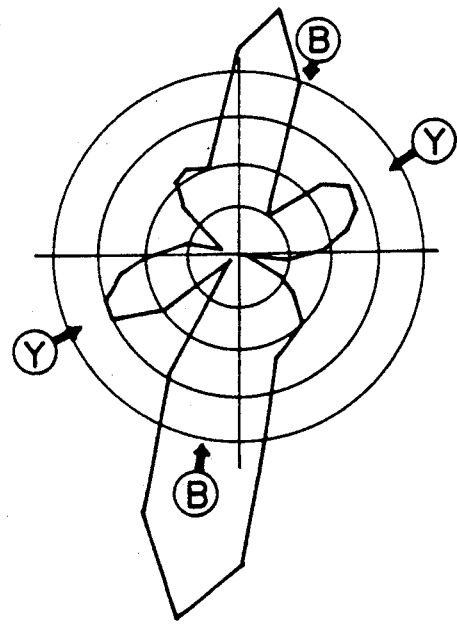

At this time, the viewing angle-dependence of color intensity as shown in FIG. 9B was attained.

EXAMPLE 4

Figure 10:
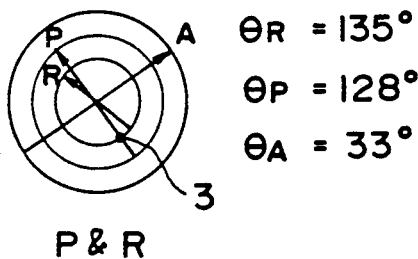
FIG. 10 is a sectional view and schematic view for illustrating an ferroelectric display apparatus according to an embodiment (Example 4) of the present invention.

FIG. 10 is a schematic view for illustrating a positional relationship among the analyzer A, polarizer P and rubbing axis R according to another embodiment of the present invention. Except for the positional relationship, this embodiment is the same as the one of Example 1. More specifically, FIG. 10 shows characteristics of this embodiment that the electric vector transmission axis P of the polarizer is set to the direction of the right average molecular long axis 3, and the electric vector transmission axis A of the analyzer is shifted from the position of right-angle cross nicols by an angle in the range of 0–20 degrees in the direction of providing a brighter bright state. In this particular example, the analyzer axis was shifted by 5 degrees in the direction of further brightening the bright state given by right-angle cross nicols.

In this example, $\theta_R$, $\theta_P$ and $\theta_A$ as defined above were set to satisfy: $\theta_R = 135$ degrees, $\theta_P = 128$ degrees and $\theta_A = 33$ degrees. The chiral smectic liquid crystal used at this time showed a tilt angle $\theta a$ of 7 degrees.

Figure 11A:
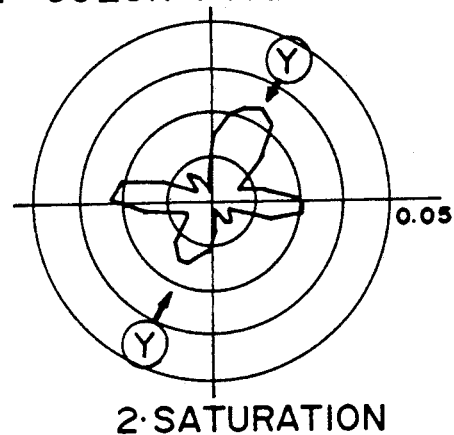
FIGS. 11A and 11B are a graph showing the panel color intensity of the display apparatus of Example 4 and a schematic view illustrating a viewing angle.
Figure 11B:
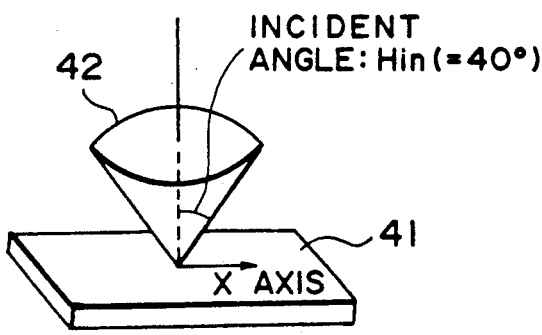

FIG. 11A is a view showing a viewing angle-dependence of the color intensity in the bright state of the above embodiment. Herein, as shown in FIG. 11B, the viewing angle is defined as an angle from a reference axis (an arbitrary selected X-axis) when a point of viewing a chiral smectic liquid crystal panel 41 is changed along an orbit 42 like a conical rim with a fixed incident angle $H_{in}$ ($H_{in}$ is fixed at 40 degrees). In FIG. 11A, the viewing angle corresponds to an angle of rotation along four concentric circles.

Further, in FIG. 11A, a distance from the center of the concentric circles represents a color intensity in terms of a distance between the chromaticity coordinates of the observed panel and the chromaticity coordinates of the standard light C on the color coordinate system (x, y) according to JIS Z8701. Further, some representative hues depending on observation directions are also shown together with arrows indicating the observation directions.

COMPARATIVE EXAMPLE 4

Figure 12A:
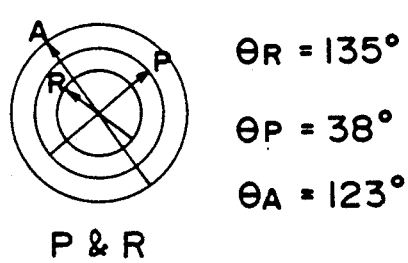
FIGS. 12A and 12B are graphs showing polarizing plates directions and the panel color intensity according to Comparative Example 4.

A display apparatus of Comparative Example 4 was prepared in the same manner as in the above Example 4 except that the positions of the analyzer axis A, the polarizer axis P and the rubbing axis R were changed to provide $\theta_R = 135$ degrees, $\theta_P = 38$ degrees and $\theta_A = 123$ degrees as shown in FIG. 12A.

Figure 12B:
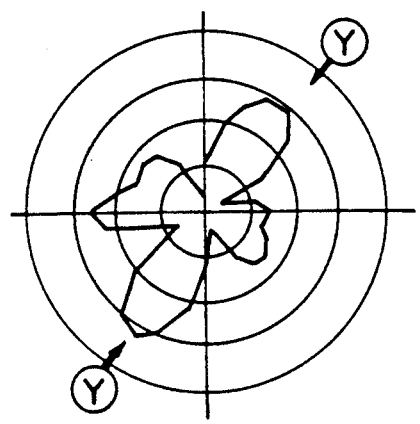

FIG. 12B shows a viewing angle-dependence of color intensity according to Comparative Example 4. In view of FIG. 12B and FIG. 11A in comparison, it is understood that the coloring of the liquid crystal display apparatus of Example 4 was remarkably improved compared with that of Comparative Example 4.

EXAMPLE 5

A display apparatus of Example 5 was prepared in the same manner as in Example 4 except that the positions of the analyzer axis A, the polarizer axis P and the rubbing axis R were changed to provide $\theta_R = 135$ degrees, $\theta_P = 123$ degrees and $\theta_A = 38$ degrees as shown in FIG. 13A.

At this time, the viewing angle-dependence of color intensity as shown in FIG. 13B was attained

EXAMPLE 6

A display apparatus of Example 6 was prepared in the same manner as in Example 4 except that the positions of the analyzer axis A, the polarizer axis P and the rubbing axis R were changed to provide $\theta_R = 135$ degrees, $\theta_P = 128$ degrees and $\theta_A = 38$ degrees as shown in FIG. 14A.

At this time, the viewing angle-dependence of color intensity as shown in FIG. 14B was attained.

COMPARATIVE EXAMPLE 5

Figure 15A:
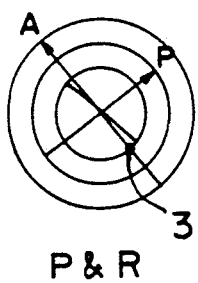
FIGS. 15A and 15B are graphs showing polarizing plates directions and the panel color intensity according to Comparative Example 5.

A display apparatus of Comparative Example 5 was prepared in the same manner as in Example 4 except that the positions of the analyzer axis A, the polarizer axis P and the rubbing axis R were changed to provide $\theta_R = 135$ degrees, $\theta_P = 33$ degrees and $\theta_A = 128$ degrees as shown in FIG. 15A.

Figure 15B:
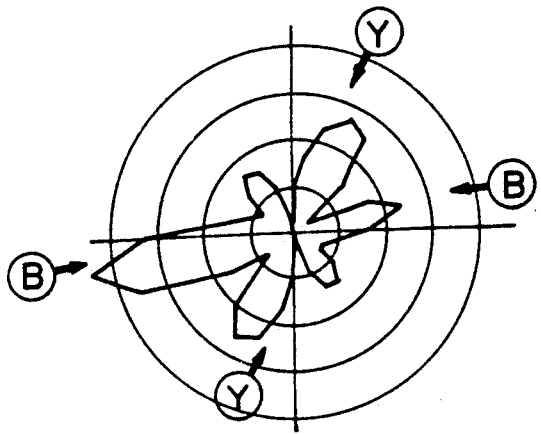

At this time, the viewing angle-dependence of color intensity as shown in FIG. 15B was attained.

COMPARATIVE EXAMPLE 6

Figure 16A:
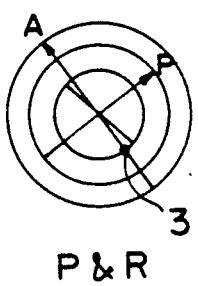
FIGS. 16A and 16B are graphs showing polarizing plates directions and the panel color intensity according to Comparative Example 6.

A display apparatus of Comparative Example 6 was prepared in the same manner as in Example 4 except that the positions of the analyzer axis A, the polarizer axis P and the rubbing axis R were changed to provide $\theta_R = 135$ degrees, $\theta_P = 38$ degrees and $\theta_A = 128$ degrees as shown in FIG. 16A.

Figure 16B:
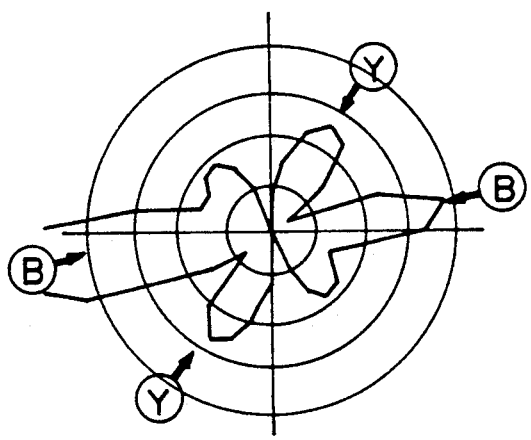

At this time, the viewing angle-dependence of color intensity as shown in FIG. 16B was attained

EXAMPLE 7

Figure 17:
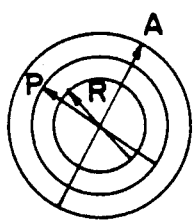
FIG. 17 is a sectional view and schematic views for illustrating an ferroelectric display apparatus according to an embodiment (Example 7) of the present invention.

FIG. 17 is a schematic view for illustrating a positional relationship among the analyzer A, polarizer P and rubbing axis R according to another embodiment of the present invention. More specifically, FIG. 17 shows characteristics of this embodiment that the electric vector transmission axis P of the polarizer is set to the direction of the left average molecular long axis 2, and the electric vector transmission axis A of the analyzer is shifted from the position of right-angle cross nicols by an angle in the range of 0–20 degrees in the direction of providing a brighter bright state. In this particular example, the analyzer axis was shifted by 5 degrees in the direction of further brightening the bright state.

In this example, $\theta_R$, $\theta_P$ and $\theta_A$ as defined above were set to satisfy: $\theta_R = 135$ degrees, $\theta_P = 142$ degrees and $\theta_A = 57$ degrees. The chiral smectic liquid crystal used at this time showed a tilt angle $\theta a$ of 7 degrees.

Figures 18A, 18B, 18C:
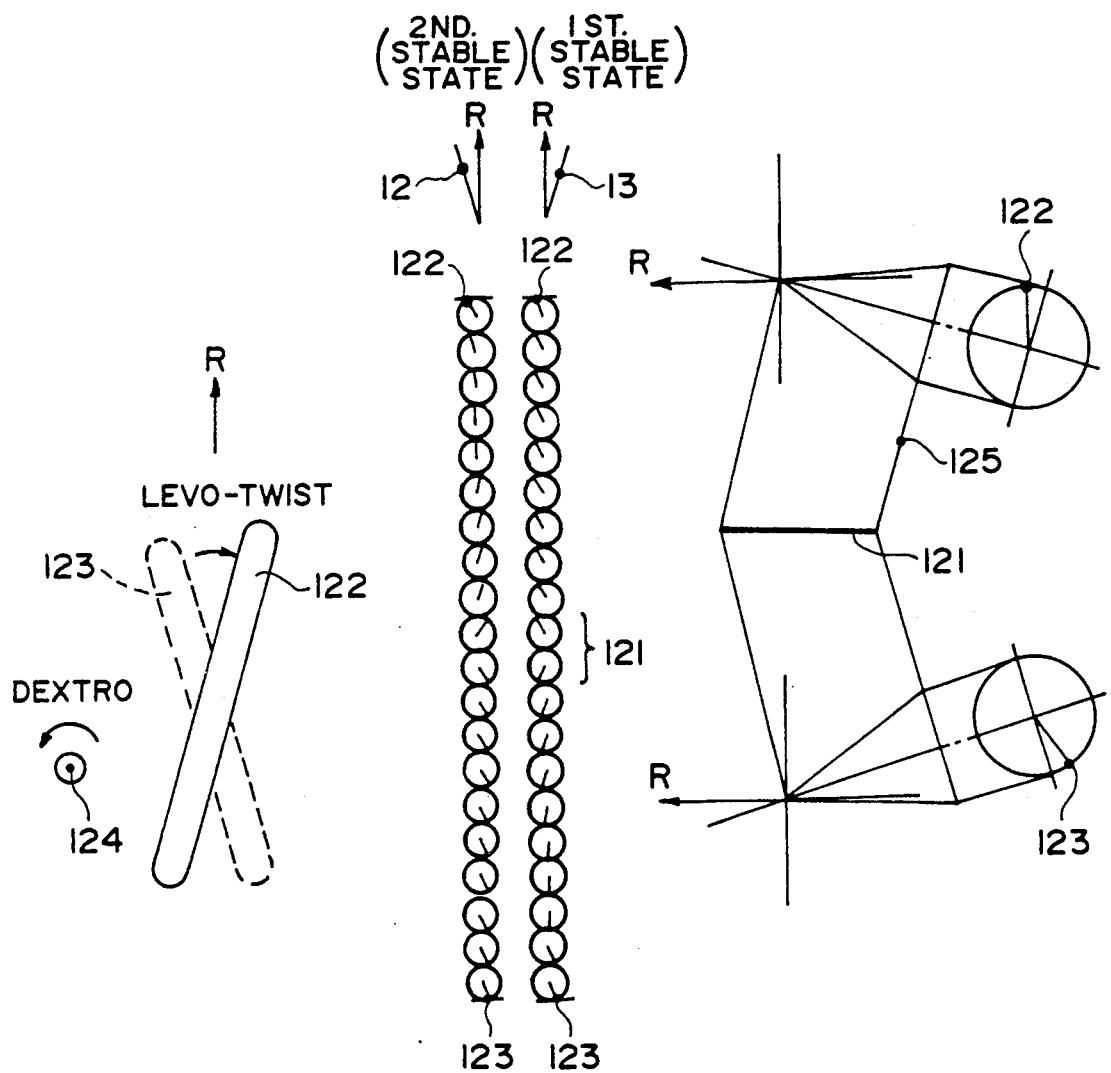
FIGS. 18A–18C are schematic views for illustrating a levo-twist alignment structure.

FIGS. 18A–18C are schematic views for illustrating a levo-twist alignment structure of a ferroelectric chiral smectic liquid crystal used in this embodiment. More specifically, FIG. 18A is a schematic view showing that the relationship between the liquid crystal molecular long axis 123 at the lower boundary (with the lower substrate) and the liquid crystal molecular long axis 122 at the upper boundary (with the upper substrate) is such that the molecular axes are twisted in the levo-rotatory direction with respect to the direction 124 from the lower substrate 11a toward the upper substrate 11b FIG. 18B is a schematic view showing states of change of C-directors of liquid crystal as viewed from bottoms of cones of chiral smectic liquid crystal ranging from the lower substrate 11a to the upper substrate 11b with respect to a first stable state providing the right average molecular axis 13 and a second stable state providing the left average molecular axis 12. It is also shown that a dextro-twist occurs from the molecules 123 at the lower boundary to the molecules 122 at the upper boundary. Further, FIG. 18C is a schematic view showing a chevron-type layer structure of a chiral smectic liquid crystal including Sm*C layers 125, molecules 121 in a central part which are aligned parallel to substrate boundaries, and rubbing directions R.

In order to obtain the above-mentioned levo-twist alignment structure, it is effective to use a ferroelectric liquid crystal having a positive Ps (spontaneous polarization) and a polar alignment film having a dipole moment directed generally inward of the cell, or to use a ferroelectric liquid crystal having a negative Ps and a polar alignment film having a dipole moment directed generally outward of the cell.

In a particular example of the above embodiment, a dextro-twist alignment state was attained by injecting a ferroelectric liquid crystal "ZLI-3488" (trade name, available from Merck K.K.) characterized by a positive Ps into a 1.5 microns-thick FLC cell having polyimide alignment films.

In addition, it was confirmed that such a levo-twist alignment state could also be formed by a ferroelectric liquid crystal "ZLI-3489" (available from Merck K.K.), etc., having positive Ps in FLC cells with thicknesses of 1.0–2.5 microns having organic alignment films, such as films of polyimide and polyethylene oxide.

FIG. 19A is a view showing a viewing angle-dependence of the color intensity in the bright state of the above embodiment. Herein, as shown in FIG. 9B, the viewing angle is defined as an angle from a reference axis (an arbitrary selected X-axis) when a point of viewing a chiral smectic liquid crystal panel 41 is changed along an orbit 42 like a conical rim with a fixed incident angle $H_{in}$ ($H_{in}$ is fixed at 40 degrees). In FIG. 19A, the viewing angle corresponds to an angle of rotation along four concentric circles.

Further, in FIG. 19A, a distance from the center of the concentric circles represents a color intensity in terms of a distance between the chromaticity coordinates of the observed panel and the chromaticity coordinates of the standard light C on the color coordinate system (x, y) according to JIS Z8701. Further, some representative hues depending on observation directions are also shown together with arrows indicating the observation directions.

COMPARATIVE EXAMPLE 7

A display apparatus of Comparative Example 7 was prepared in the same manner as in the above Example 7 except that the positions of the analyzer axis A, the polarizer axis P and the rubbing axis R were changed to provide $\theta_R = 135$ degrees, $\theta_P = 52$ degrees and $\theta_A = 147$ degrees as shown in FIG. 20A.

FIG. 20B shows a viewing angle-dependence of color intensity according to Comparative Example 7. In view of FIG. 20B and FIG. 19A in comparison, it is understood that the coloring of the liquid crystal display apparatus of Example 7 was remarkably improved compared with that of Comparative Example 7.

EXAMPLE 8

Figure 21A:
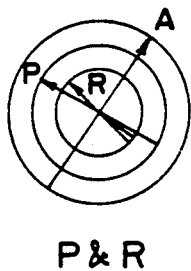
FIGS. 21A and 21B are graphs showing polarizing plates directions and the panel color intensity according to Example 8.

A display apparatus of Example 8 was prepared in the same manner as in Example 7 except that the positions of the analyzer axis A, the polarizer axis P and the rubbing axis R were changed to provide $\theta_R = 135$ degrees, $\theta_P = 147$ degrees and $\theta_A = 52$ degrees as shown in FIG. 21A.

Figure 21B:
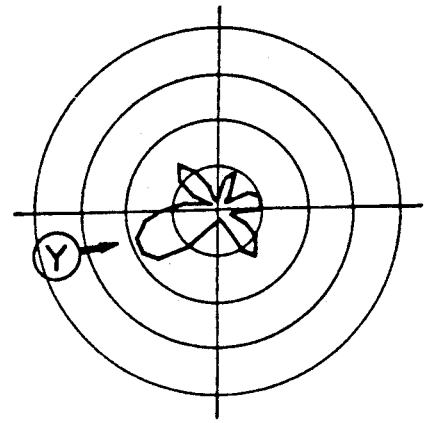

At this time, the viewing angle-dependence of color intensity as shown in FIG. 21B was attained.

EXAMPLE 9

Figure 22A:
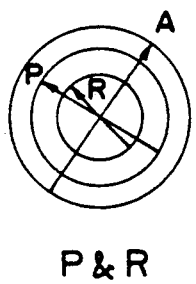
FIGS. 22A and 22B are graphs showing polarizing plates directions and the panel color intensity according to Example 9.

A display apparatus of Example 9 was prepared in the same manner as in Example 7 except that the positions of the analyzer axis A, the polarizer axis P and the rubbing axis R were changed to provide $\theta_R = 135$ degrees, $\theta_P = 142$ degrees and $\theta_A = 52$ degrees as shown in FIG. 22A.

Figure 22B:
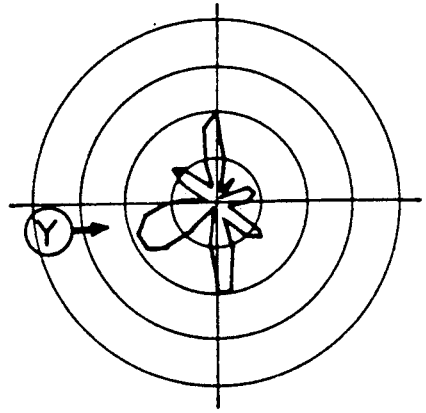

At this time, the viewing angle-dependence of color intensity as shown in FIG. 22B was attained.

COMPARATIVE EXAMPLE 8

A display apparatus of Comparative Example 8 was prepared in the same manner as in Example 7 except that the positions of the analyzer axis A, the polarizer axis P and the rubbing axis R were changed to provide $\theta_R = 135$ degrees, $\theta_P = 57$ degrees and $\theta_A = 142$ degrees as shown in FIG. 8A.

At this time, the viewing angle-dependence of color intensity as shown in FIG. 23B was attained.

COMPARATIVE EXAMPLE 9

A display apparatus of Comparative Example 9 was prepared in the same manner as in Example 7 except that the positions of the analyzer axis A, the polarizer axis P and the rubbing axis R were changed to provide $\theta_R = 135$ degrees, $\theta_P = 52$ degrees and $\theta_A = 142$ degrees as shown in FIG. 24A.

At this time, the viewing angle-dependence of color intensity as shown in FIG. 24B was attained.

EXAMPLE 10

Figure 25:
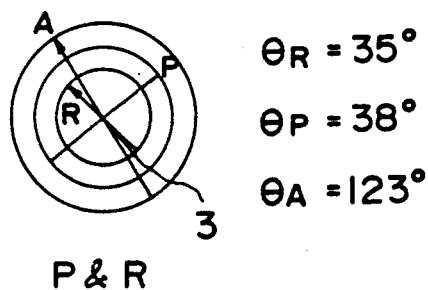
FIG. 25 is a schematic view for illustrating an ferroelectric display apparatus according to an embodiment (Example 10) of the present invention.

FIG. 25 is a schematic view for illustrating a positional relationship among the analyzer A, polarizer P and rubbing axis R according to another embodiment of the present invention. Except for the positional relationship, this embodiment is the same as the one of Example 7. More specifically, FIG. 25 shows characteristics of this embodiment that the electric vector transmission axis P of the polarizer is set to a direction perpendicular to the right average molecular long axis 3, and the electric vector transmission axis A of the analyzer is shifted from the position of right-angle cross nicols by an angle in the range of 0–20 degrees in the direction of providing a brighter bright state. In this particular example, the analyzer axis was shifted by 5 degrees in the direction of further brightening the bright state.

In this example, $\theta_R$, $\theta_P$ and $\theta_A$ as defined above were set to satisfy: $\theta_R = 135$ degrees, $\theta_P = 38$ degrees and $\theta_A = 123$ degrees. The chiral smectic liquid crystal used at this time showed a tilt angle $\theta a$ of 7 degrees.

Figure 26A:
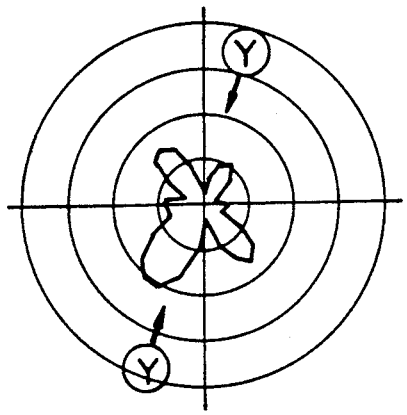
FIGS. 26A and 26B are a graph showing the panel color intensity of the display apparatus of Example 10 and a schematic view illustrating a viewing angle.
Figure 26B:
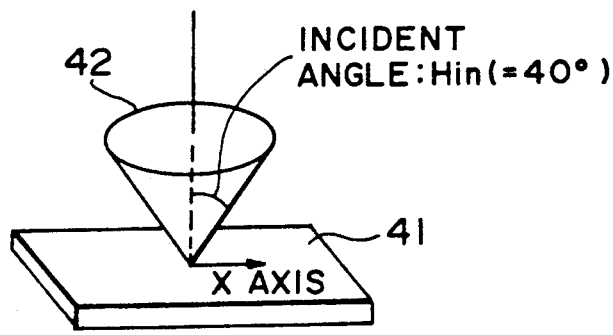

FIG. 26A is a view showing a viewing angle-dependence of the color intensity in the bright state of the above embodiment. Herein, as shown in FIG. 26B the viewing angle is defined as an angle from a reference axis (an arbitrary selected X-axis) when a point of viewing a chiral smectic liquid crystal panel 41 is changed along an orbit 42 like a conical rim with a fixed incident angle $H_{in}$ ($H_{in}$ is fixed at 40 degrees). In FIG. 26A, the viewing angle corresponds to an angle of rotation along four concentric circles.

Further, in FIG. 26A, a distance from the center of the concentric circles represents a color intensity in terms of a distance between the chromaticity coordinates of the observed panel and the chromaticity coordinates of the standard light C on the color coordinate system (x, y) according to JIS Z8701. Further, some representative hues depending on observation directions are also shown together with arrows indicating the observation directions.

COMPARATIVE EXAMPLE 10

Figure 27A:
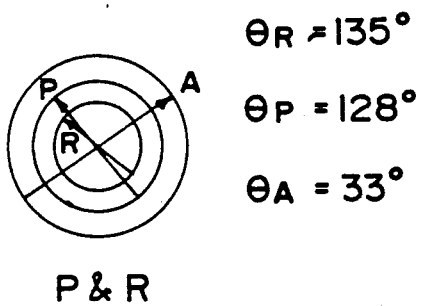
FIGS. 27A and 27B are graphs showing polarizing plates directions and the panel color intensity according to Comparative Example 10.

A display apparatus of Comparative Example 10 was prepared in the same manner as in the above Example 10 except that the positions of the analyzer axis A, the polarizer axis P and the rubbing axis R were changed to provide $\theta_R = 135$ degrees, $\theta_P = 128$ degrees and $\theta_A = 33$ degrees as shown in FIG. 27A.

Figure 27B:
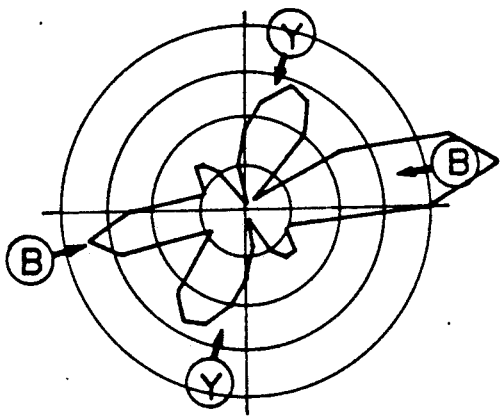

FIG. 27B shows a viewing angle-dependence of color intensity according to Comparative Example 10. In view of FIG. 27B and FIG. 26A in comparison, it is understood that the coloring of the liquid crystal display apparatus of Example 10 was remarkably improved compared with that of Comparative Example 10.

EXAMPLE 11

A display apparatus of Example 11 was prepared in the same manner as in Example 1 except that the positions of the analyzer axis A, the polarizer axis P and the rubbing axis R were changed to provide $\theta_R = 135$ degrees, $\theta_P = 133$ degrees and $\theta_A = 128$ degrees as shown in FIG. 28A.

At this time, the viewing angle-dependence of color intensity as shown in FIG. 28B was attained.

EXAMPLE 12

A display apparatus of Example 12 was prepared in the same manner as in Example 10 except that the positions of the analyzer axis A, the polarizer axis P and the rubbing axis R were changed to provide $\theta_R = 135$ degrees, $\theta_P = 38$ degrees and $\theta_A = 128$ degrees as shown in FIG. 29A.

At this time, the viewing angle-dependence of color intensity as shown in FIG. 29B was attained.

COMPARATIVE EXAMPLE 11

A display apparatus of Comparative Example 11 was prepared in the same manner as in Example 1 except that the positions of the analyzer axis A, the polarizer axis P and the rubbing axis R were changed to provide $\theta_R = 135$ degrees, $\theta_P = 123$ degrees and $\theta_A = 38$ degrees as shown in FIG. 30A.

At this time, the viewing angle-dependence of color intensity as shown in FIG. 30B was attained.

COMPARATIVE EXAMPLE 12

A display apparatus of Comparative Example 12 was prepared in the same manner as in Example 10 except that the positions of the analyzer axis A, the polarizer axis P and the rubbing axis R were changed to provide $\theta_R = 135$ degrees, $\theta_P = 128$ degrees and $\theta_A = 38$ degrees as shown in FIG. 31A.

At this time, the viewing angle-dependence of color intensity as shown in FIG. 31B was attained.

As described above, the apparatus according to the present invention (Examples 1-12) provided a better display quality as represented by suppressed coloring in the bright display state in comparison with apparatus outside the invention (Comparative Examples 1-12).

Further, it is also shown that coloring was more remarkably suppressed in cases where the analyzer A was shifted from the position of right-angle cross nicols by 5 degrees in the direction of providing a brighter bright state than in cases of right angle nicols and than in cases where the polarizer P was shifted from the position of right-angle cross nicols by 5 degrees in the direction of providing a brighter bright state.

What is claimed is:

1. A liquid crystal apparatus, comprising:
   a liquid crystal cell comprising a pair of substrates, and a chiral smectic liquid crystal showing at least two different optically stable states formed by cooling from a uniaxial alignment phase and disposed between the substrates; and
   a polarizer and an analyzer disposed to sandwiched the liquid crystal cell;
   wherein the chiral smectic liquid crystal, polarizer and analyzer are disposed to satisfy a set of conditions that the long axes of the chiral smectic liquid crystal molecules are aligned with a twist in a clockwise direction along the direction from the polarizer toward the analyzer to form an average molecular axis providing one optically stable state, and when the average molecular long axis is switched to provide another optically stable state latched in a counter-clockwise direction with respect to the direction from the analyzer toward the polarizer, the polarizer is disposed to have an electric vector transmission axis which is substantially perpendicular to the average molecular long axis.

2. An apparatus according to claim 1, wherein the electric vector transmission axis of the analyzer is shifted from the position of right angle cross nicols by an angle in the range of 0-20 degrees in a direction of providing a brighter bright state.

3. An apparatus according to claim 1, wherein said uniaxial alignment phase is smectic A phase.

4. An apparatus according to claim 1, wherein said pair of substrates have been subjected to mutually parallel rubbing treatments.

5. An apparatus according to claim 1, which comprises a light source behind the polarizer.

6. An apparatus according to claim 1, wherein said chiral smectic liquid crystal has a chevron structure.

7. An apparatus according to claim 1, wherein said chiral smectic liquid crystal has a positive spontaneous polarization.

8. An apparatus according to claim 1, wherein said chiral smectic liquid crystal has a negative spontaneous polarization.

9. A liquid crystal apparatus, comprising:
   a liquid crystal cell comprising a pair of substrates, and a chiral smectic liquid crystal showing at least two different optically stable states formed by cooling from a uniaxial alignment phase and disposed between the substrates; and
   a polarizer and an analyzer disposed to sandwiched the liquid crystal cell;
   wherein the chiral smectic liquid crystal, polarizer and analyzer are disposed to satisfy a set of conditions that the long axes of the chiral smectic liquid crystal molecules are aligned wit a twist in a clockwise direction along the direction from the polarizer toward the analyzer to form an average molecular axis providing one optically stable state, and when the average molecular long axis is switched to provide another optically stable state latched in a clockwise direction with respect to the direction from the analyzer toward the polarizer, the polarizer is disposed to have an electric vector transmission axis which is substantially parallel to the average molecular long axis.

10. An apparatus according to claim 9, wherein the electric vector transmission axis of the analyzer is shifted from the position of right angle cross nicols by an angle in the range of 0-20 degrees in a direction of providing a brighter bright state.

11. An apparatus according to claim 9, wherein said uniaxial alignment phase is smectic A phase.

12. An apparatus according to claim 9, wherein said pair of substrates have been subjected to mutually parallel rubbing treatments.

13. An apparatus according to claim 9, which comprises a light source behind the polarizer.

14. An apparatus according to claim 9, wherein said chiral smectic liquid crystal has a chevron structure.

15. An apparatus according to claim 9, wherein said chiral smectic liquid crystal has a positive spontaneous polarization.

16. An apparatus according to claim 9, wherein said chiral smectic liquid crystal has a negative spontaneous polarization.

17. A liquid crystal apparatus, comprising:
a liquid crystal cell comprising a pair of substrates, and a chiral smectic liquid crystal showing at least two different optically stable states formed by cooling from a uniaxial alignment phase and disposed between the substrates; and
a polarizer and an analyzer disposed to sandwiched the liquid crystal cell;
wherein the chiral smectic liquid crystal, polarizer and analyzer are disposed to satisfy a set of conditions that the long axes of the chiral smectic liquid crystal molecules are aligned with a twist in a counter-clockwise direction along the direction from the polarizer toward the analyzer to form an average molecular axis providing one optically stable state, and when the average molecular long axis is switched to provide another optically stable state latched in a counter-clockwise direction with respect to the direction from the analyzer toward the polarizer, the polarizer is disposed to have an electric vector transmission axis which is substantially parallel to the average molecular long axis.

18. An apparatus according to claim 17, wherein the electric vector transmission axis of the analyzer is shifted from the position of right angle cross nicols by an angle in the range of 0–20 degrees in a direction of providing a brighter bright state.

19. An apparatus according to claim 17, wherein said uniaxial alignment phase is smectic A phase.

20. An apparatus according to claim 17, wherein said pair of substrates have been subjected to mutually parallel rubbing treatments.

21. An apparatus according to claim 17, which comprises a light source behind the polarizer.

22. An apparatus according to claim 17, wherein said chiral smectic liquid crystal has a chevron structure.

23. An apparatus according to claim 17, wherein said chiral smectic liquid crystal has a positive spontaneous polarization.

24. An apparatus according to claim 17, wherein said chiral smectic liquid crystal has a negative spontaneous polarization.

25. A liquid crystal apparatus, comprising:
a liquid crystal cell comprising a pair of substrates, and a chiral smectic liquid crystal showing at least two different optically stable states formed by cooling from a uniaxial alignment phase and disposed between the substrates; and
a polarizer and an analyzer disposed to sandwiched the liquid crystal cell;
wherein the chiral smectic liquid crystal, polarizer and analyzer are disposed to satisfy a set of conditions that the long axes of the chiral smectic liquid crystal molecules are aligned with a twist in a clockwise direction along the direction from the polarizer toward the analyzer to form an average molecular axis providing one optically stable state, and when the average molecular long axis is switched to provide another optically stable state latched in a counter-clockwise direction with respect to the direction from the analyzer toward the polarizer, the polarizer is disposed to have an electric vector transmission axis which is substantially perpendicular to the average molecular long axis.

26. An apparatus according to claim 25, wherein the electric vector transmission axis of the analyzer is shifted from the position of right angle cross nicols by an angle in the range of 0–20 degrees in a direction of providing a brighter bright state.

27. An apparatus according to claim 25, wherein said uniaxial alignment phase is smectic A phase.

28. An apparatus according to claim 25, wherein said pair of substrates have been subjected to mutually parallel rubbing treatments.

29. An apparatus according to claim 25, which comprises a light source behind the polarizer.

30. An apparatus according to claim 25, wherein said chiral smectic liquid crystal has a chevron structure.

31. An apparatus according to claim 25, wherein said chiral smectic liquid crystal has a positive spontaneous polarization.

32. An apparatus according to claim 25, wherein said chiral smectic liquid crystal has a negative spontaneous polarization.

* * * * *

UNITED STATES PATENT AND TRADEMARK OFFICE
CERTIFICATE OF CORRECTION

PATENT NO. : 5,035,491

DATED : July 30, 1991

INVENTOR(S) : Hideyuki Kawagishi, et al

It is certified that error appears in the above-identified patent and that said Letters Patent is hereby corrected as shown below:

Title Page:
IN [57] ABSTRACT

Line 6, "sandwiched" should read --sandwich--.
    Line 17, "proving" should read --providing--.

COLUMN 1

Line 65, "proving" should read --providing--.

COLUMN 2

Line 19, "an" should read --a--.
    Line 46, "an" should read --a--.
    Line 67, "an" should read --a--.

COLUMN 3

Line 21, "an" should read --a--.
    Line 56, "An" should read --A--.

COLUMN 4

Line 8, "counter-clockwise" should read --counterclockwise--.
    Line 29, "$O_A$= 147 degrees." should read --$\theta_A$= 147 degrees.--.
    Line 58, "FIG. 1C" should read --FIG. 2C--.

COLUMN 5

Line 30, "$\theta_R$ 90" should read --$\theta_R$= 90--.
    Line 39, "$\theta A$ = 105 degrees" should read --$\theta_A$= 105 degrees-- and "$\theta_R$ 90" should read --$\theta_R$= 90--.
    Line 56, "Center" should read --center--.

UNITED STATES PATENT AND TRADEMARK OFFICE
CERTIFICATE OF CORRECTION

PATENT NO. : 5,035,491

DATED : July 30, 1991

INVENTOR(S) : Hideyuki Kawagishi, et al

It is certified that error appears in the above-identified patent and that said Letters Patent is hereby corrected as shown below:

COLUMN 6

Line 3, "θR = 135 degrees" should read --$\theta_R$= 135 degrees--.

COLUMN 8

Line 40, "substrate 11b" should read --substrate 11b.--.

COLUMN 9

Line 9, "FIG. 9B," should read --FIG. 19B,--.
Line 68, "FIG. 8A." should read --FIG. 23A.--.

COLUMN 11

Line 61, "sandwiched" should read --sandwich--.

COLUMN 12

Line 4, "counter-clockwise" should read --counterclockwise--.
Line 35, "sandwiched" should read --sandwich--.
Line 40, "wit" should read --with--.

COLUMN 13

Line 11, "sandwiched" should read --sandwich--.
Line 17, "counter-clockwise" should read --counterclockwise--.
Line 23, "counter-clockwise" should read --counterclockwise--.

UNITED STATES PATENT AND TRADEMARK OFFICE
CERTIFICATE OF CORRECTION

PATENT NO. : 5,035,491

DATED : July 30, 1991

INVENTOR(S) : Hideyuki Kawagishi, et al

It is certified that error appears in the above-identified patent and that said Letters Patent is hereby corrected as shown below:

COLUMN 14

Line 10, "sandwiched" should read --sandwich--.
Line 21, "counter-clockwise" should read --counterclockwise--.

Signed and Sealed this

Thirteenth Day of April, 1993

Attest:

STEPHEN G. KUNIN

*Attesting Officer*     *Acting Commissioner of Patents and Trademarks*